United States Patent

Patton et al.

[15] 3,701,149
[45] Oct. 24, 1972

[54] FREQUENCY AVERAGING CONTROLLED FALSE ALARM RATE (CFAR) CIRCUIT

[72] Inventors: Terence R. Patton, Severna Park; Melvin B. Ringel, Baltimore, both of Md.

[73] Assignee: The United States of America as represented by the Secretary of the Navy

[22] Filed: July 2, 1971

[21] Appl. No.: 159,311

[52] U.S. Cl..................343/5 DP, 343/7 A, 343/7.7, 343/8
[51] Int. Cl...............................................G01s 7/34
[58] Field of Search...................343/5 DP, 7 A, 7.7, 8

[56] References Cited

UNITED STATES PATENTS

| | | |
|---|---|---|
| 3,444,557 | 5/1969 | Calhoon et al. ...............343/8 |
| 3,587,097 | 6/1971 | Stull..........................343/7 A |
| 3,623,096 | 11/1971 | Morris.......................343/7.7 |
| 3,631,486 | 12/1971 | Anders et al. .................343/8 |

Primary Examiner—T. H. Tubbesing
Attorney—R. S. Sciascia

[57] ABSTRACT

A frequency averaging CFAR circuit having a digital filter bank for receiving radar doppler echoes that are conducted sequentially into serially connected metal oxide semiconductor (MOS) type delay shift register networks with the outputs of shift registers on opposite sides of a center frequency register being summed to produce an average value applied to a threshold circuit together with the output of the center frequency register output to cause the threshold level to vary in accordance with the averaged noise and clutter signals and to detect a target signal whenever the output of the center frequency register exceeds the threshold.

4 Claims, 3 Drawing Figures

PATENTED OCT 24 1972　　　　　　　　　　　　　　　　　3,701,149

INVENTORS.
M.B. RINGEL & T.R. PATTON
BY
H. H. Losche
ATTORNEY

FREQUENCY AVERAGING CONTROLLED FALSE ALARM RATE (CFAR) CIRCUIT

BACKGROUND OF THE INVENTION

This invention relates to CFAR circuits and more particularly to frequency averaging instead of time averaging of CFAR circuits.

The most recently known pulse doppler radars have employed a digital technique for filtering the doppler spectrum into a very large number of narrow band outputs. These bandwidths may be as low as 50 Hz per filter. Various techniques are employed for testing each filter output for the presence of a target. A fixed threshold detector is often used but this reduces considerably the effectiveness of target detection since the large variation in the levels of noise and target signals will cause some target signals to go undetected because they will be below the threshold and false alarms may be detected as targets since the noise level may peak above the threshold. Another method of detecting targets utilize a time or ensemble averaging CFAR technique which determines the instantaneous threshold setting by integrating the output of each filter as a function of time. Here a slowly varying output is effectively tracked and a good estimate of the instantaneous threshold setting results. This technique, however, does not cope very effectively with a rapidly changing output, due to the long integration time (normally in the order of one second) required for threshold determination. Accordingly, fixed and time averaging threshold setting have disadvantages in controlling the false alarm rate for which they are intended to control.

SUMMARY OF THE INVENTION

In the present invention the filters in a digital filter bank storing pulse doppler echo returns are sampled sequentially and these samples are sequenced into a serial string of MOS type delay shift register networks. The registers on each side of a single register, representative of the center frequency, have the outputs thereof summed to provide an ensemble average of the register outputs. While the number of MOS type delay registers in a shift register is a matter of choice, the invention herein utilizes four on each side of the center frequency register which have the outputs summed and applied to a threshold detector. The output of the center frequency MOS register is also applied to the threshold detector for comparison with the averaged threshold level which varys in accordance with noise and clutter level. This means of threshold setting and target detection is equivalent to time CFAR in the noise only region (if a large number of frequency samples are used) and superior in the region where clutter is above the noise level. It is accordingly a general object of this invention to provide a frequency averaging of the noise and clutter for CFAR that varys the threshold level up and down to eliminate the noise and clutter from a detected signal which protrudes above the threshold.

BRIEF DESCRIPTION OF THE DRAWING

These and other objects and the attendant advantages, features and uses will become more apparent to those skilled in the art as a more detailed description proceeds when considered along with the accompanying drawing in which.

DESCRIPTION OF THE PREFERRED EMBODIMENT

Figure 1:
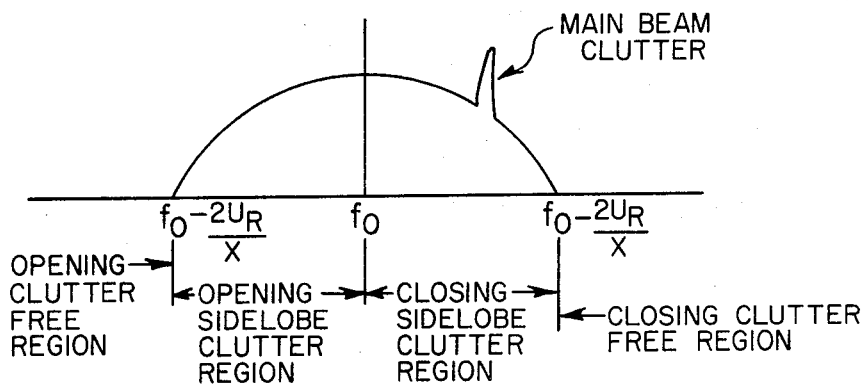
FIG. 1 is a pulse doppler spectrum.

Referring more particularly to FIG. 1, a high PRF pulse doppler is a radar technique available for achieving long range performance in the presence of noise and clutter. Pulse doppler radar pulses are transmitted at sufficiently high PRF to provide enough spacing between adjacent PRF lines in the received doppler spectrum to allow unambiguous velocity measurements of detected airborne targets. A pulse doppler radar uses only the portion of the spectrum associated with one spectral line, usually the carrier, as shown in FIG. 1. This portion of the spectrum is for the case where the radar has a horizontal velocity. In this Figure the spectrum covers the region on both sides of the center frequency, $f_o$, and for the opening and closing side lobe clutter region. Outside this spectrum are the opening and closing clutter-free regions. This spectrum illustrates the main beam clutter as shown on the spectrum curve and it is this spectrum area with which this invention deals.

Figure 2:
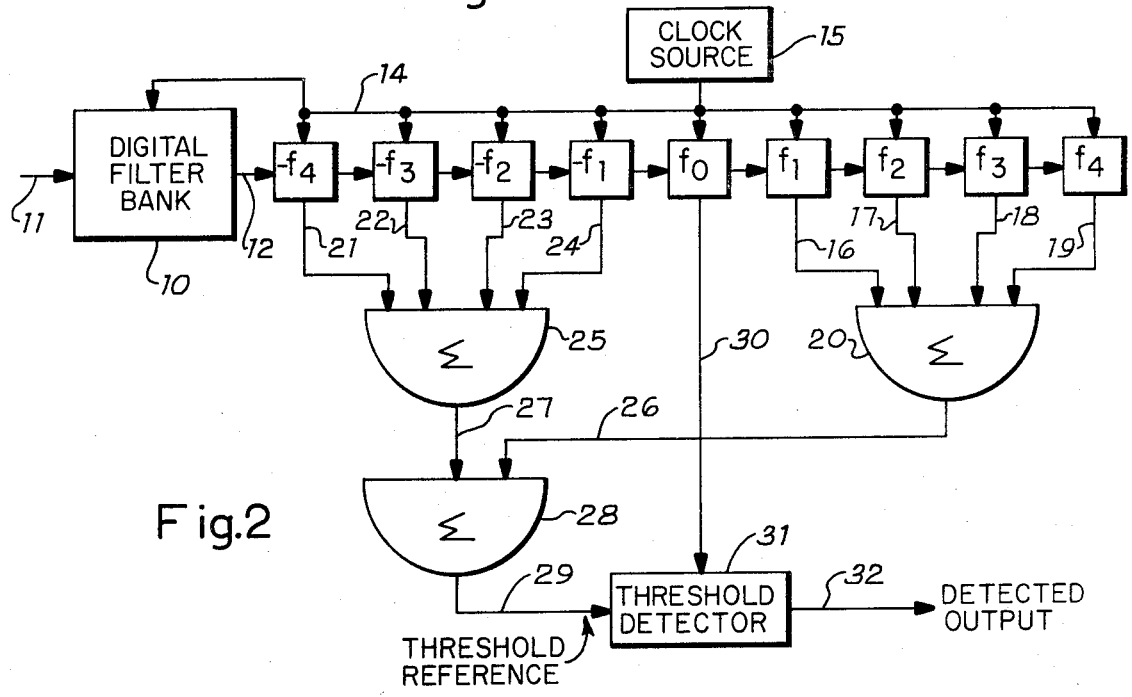
FIG. 2 is a block circuit schematic of the frequency averaging device of this invention.

Referring more particularly to FIG. 2, a pulse doppler radar of any well known type applies the echo doppler frequencies to a digital filter bank 10 over an input 11 thereto, as well understood by those skilled in the pulse doppler radar art. These doppler frequencies are stored in the digital filter bank 10 which consists of a plurality of bandpass filters which are read out sequentially on the output 12 in synchronism with a clock input source over conductor 14 from a clock source or pulse generator 15 which may be crystal controlled to high accuracy. The output 12 of the digital filter bank 10 is applied to the first of a series of coupled MOS delay shift register stages, identified by their frequencies of $f_o$, $f_1$ through $f_4$ and $-f_4$. The nine shift register stages $f$ are illustrated herein in which $f_o$ is the center frequency of the expected doppler returns, although other numbers of stages more or less could be used on each side of the center frequency, as desired. The four outputs of $f_1$ through $f_4$ are applied by way of conductors 16 through 19 to a summing network 20 while the four outputs on conductors 21 through 24 are conducted to a summing network 25. The outputs 26 and 27 from the summing networks 20 and 25, respectively, are coupled as inputs to a third summing network 28 to provide a summation and averaging of all the frequencies above and below the center frequency $f_o$ on the output conductor 29. The output conductor 29 is conducted as a threshold reference input to a threshold detector 31 and the output 30 of the center frequency MOS delay filter $f_o$ is conducted as the signal input to the threshold detector. Whenever the signal input of the threshold detector 31 is of greater amplitude than the average threshold reference applied by way of 29, it will produce a signal pulse on the threshold detector output 32 for additional controlling or display circuitry (not shown).

OPERATION

Figure 3:
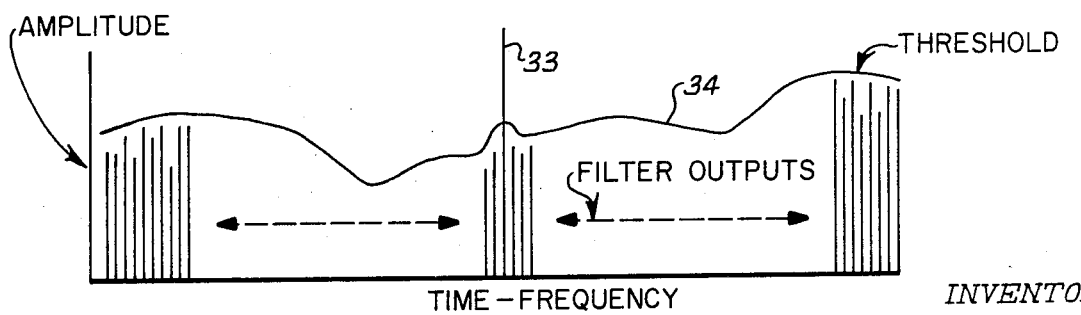
FIG. 3 is a frequency-time chart of the register outputs and threshold of the device in FIG. 1.

In the operation of the device shown in FIG. 2, the pulse doppler radar receiver will conduct its received signals by way of input 11 to the digital filter bank which sorts the various frequencies into the bank of filters therein and these filters are read out sequentially over the output 12 to the first of the MOS delay registers. The frequency signals will be sequenced to the right through the MOS delay registers by the clock pulses. As more particularly shown in FIG. 3, these filter outputs are read out sequentially in frequency the amplitude of the information in each filter as shown by the vertical upstanding lines representing the digital outputs which, in summation through 20, 25, and 28, will produce a varying amplitude threshold, also as shown in FIG. 3. Any target signal of high amplitude change in any filter of the filter bank 10 will accordingly be sequentially fed down the series string of MOS delay registers averaging the target signal until it arrives at the center frequency register $f_o$ at which time it will greatly exceed the average threshold as shown by the target line 33 extending above the threshold curve 34 in FIG. 3. As the target signal amplitude frequency bit 33 is shifted on down the series string of MOS delay registers, it again will be averaged with the threshold only to appear again in the next cycle of pulse doppler scan, as well understood by those skilled in the pulse doppler radar receiver art. In this manner the threshold amplitude set into the threshold detector 31 is by frequency averaging to vary up and down in accordance with noise and clutter and even to the extent of averaging a target signal until the target signal arrives at the MOS delay $f_o$. In order to prevent a target from desensitizing its own threshold, it is important that the filter being tested for a detection not be included in the sum or average used by the threshold. Hence, the center frequency stage $f_o$ is excluded from the threshold summation or averaging networks 20, 25, and 28. As hereinbefore stated the number of MOS delay shift register stages summed into the threshold may vary with the type of radar system being used. However, the best results are achieved when the nearest frequencies to the center frequency are used due to the degradation in correlation as the deviation from center frequency is increased. Accordingly, by this frequency averaging, as shown and described for FIG. 2, rapid spurious changes in noise or clutter will be averaged and will not produce a false alarm and even a target signal will be so averaged until it arrives at the center frequency where it will be prominent in display and not lost where high clutter and noise signals result.

While many modifications and changes may be made in the constructional details as by increasing or decreasing the number MOS delay shift register stages or the summing networks without departing from the invention, we desire to be limited in the spirit of our invention only by the scope of the appended claims.

We claim:

1. A frequency averaging CFAR circuit comprising:

a digital filter bank for receiving pulse doppler radar echo signals therein and storing same;

a plurality of serially coupled shift register stages having an input to the series and an output from each register, a central register being representative of the center frequency;

a threshold detector having a threshold level input, a signal input coupled to said output of said central register, and an output;

a summing circuit having a plurality of inputs coupling the outputs of said serially coupled registers other than said center register and having an output coupled to said threshold level input; and a means to produce sequential readout of said digital filter bank into said plurality of serially coupled registers and to shift said inputs to said plurality of serially coupled registers in serial sequence therethrough whereby said summing circuit averages all signals sequentially proceeding through said registers to vary the threshold voltage proportional to noise and clutter signals along with a plurality of echo signals to control the false alarm rate.

2. A frequency having CFAR circuit as set forth in claim 1 wherein said plurality of digital registers are metal oxide semiconductor type delay shift register stages.

3. A frequency averaging CFAR circuit as set forth in claim 2 wherein said summing circuit includes a first and second summing network for each set of registers preceding and succeeding said central register, and a third summing network coupling the outputs of said first and second summing networks for each set of registers to produce said output to said threshold level input.

4. A frequency averaging CFAR circuit as set forth in claim 3 wherein said means to produce sequential readout of said digital filter bank and to shift signals through said shift register in sequence is a clock circuit.

* * * * *